US008565399B2

(12) United States Patent
Siminoff (10) Patent No.: US 8,565,399 B2
(45) Date of Patent: *Oct. 22, 2013

(54) SYSTEM AND METHOD FOR MODIFYING COMMUNICATION INFORMATION (MCI)

(71) Applicant: NobelBiz, Inc., Carlsbad, CA (US)

(72) Inventor: James Siminoff, Pacific Palisades, CA (US)

(73) Assignee: NobelBiz, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/676,546

(22) Filed: Nov. 14, 2012

(65) Prior Publication Data
US 2013/0070918 A1 Mar. 21, 2013

Related U.S. Application Data (63) Continuation of application No. 13/013,233, filed on Jan. 25, 2011, which is a continuation of application No. 11/584,176, filed on Oct. 20, 2006, now Pat. No. 7,899,169.

(60) Provisional application No. 60/728,717, filed on Oct. 20, 2005.

(51) Int. Cl.
H04M 3/42 (2006.01)

(52) U.S. Cl.
USPC ............ 379/201.01; 379/220.01; 379/221.01; 379/142.06

(58) Field of Classification Search
USPC .............. 379/201.01, 220.01, 221.01, 142.06
See application file for complete search history.

(56) References Cited

U.S. PATENT DOCUMENTS

| 6,137,870 A | 10/2000 | Scherer |
| 6,324,272 B1 | 11/2001 | Abu-Shukhaidem et al. |
| 6,330,327 B1 | 12/2001 | Lee et al. |
| 6,546,238 B1 | 4/2003 | Nightingale et al. |
| 6,556,818 B1 | 4/2003 | Meehan |
| 6,608,892 B2 | 8/2003 | Shaffer et al. |
| 6,700,972 B1 | 3/2004 | McHugh et al. |

(Continued)

FOREIGN PATENT DOCUMENTS

| EP | 0944229 A1 | 9/1999 |
| JP | 2004112253 | 4/2004 |

OTHER PUBLICATIONS

Treese, G. Windfield and Stewart, Lawrence C., An Architecture for Security and Privacy in Mobile Communications, 29th TPRC Conference, 2001, arXiv:cs/0110042v! [cs.CY] Oct. 19, 2001, Cornell University Library, submitted Oct. 19, 2001.

(Continued)

Primary Examiner — Quynh Nguyen (57) ABSTRACT

A system for handling an outbound call from a call originator to a call target including a database storing a plurality of outgoing telephone numbers, each outgoing telephone number having one of two or more area codes; and an information processor controlled by the call originator. The information processor configured to process a trigger comprising at least an area code of a telephone number of the call target; select from the database a telephone number from the plurality of outgoing telephone numbers where the selected telephone number has at least an area code the same as the area code of the telephone number of the call target; set caller identification data of the outbound call to the selected telephone number; and transmit the caller identification data to the call target in connection with the outbound call.

27 Claims, 5 Drawing Sheets (56) References Cited

U.S. PATENT DOCUMENTS

| | | | |
|---|---|---|---|
| 6,714,535 | B1 | 3/2004 | Herh |
| 6,813,344 | B1 | 11/2004 | Lemke |
| 6,901,266 | B2 | 5/2005 | Henderson |
| 7,027,575 | B1 | 4/2006 | Burgess |
| 7,340,262 | B1 | 3/2008 | Gillespie et al. |
| 7,346,156 | B1 | 3/2008 | Choupak et al. |
| 7,376,228 | B2 | 5/2008 | Haug, Jr. et al. |
| 7,602,894 | B1 | 10/2009 | Shaffer et al. |
| 7,640,009 | B2 | 12/2009 | Belkin et al. |
| 7,756,253 | B2 | 7/2010 | Breen et al. |
| 7,925,003 | B2 | 4/2011 | Haug, Jr. et al. |
| 8,027,332 | B1 | 9/2011 | Martin et al. |
| 8,040,875 | B2 | 10/2011 | Barclay et al. |
| 2002/0061100 | A1 | 5/2002 | DiCamillo et al. |
| 2002/0181681 | A1 | 12/2002 | Mani |
| 2003/0007616 | A1 | 1/2003 | Alves et al. |
| 2004/0120477 | A1 | 6/2004 | Nguyen et al. |
| 2005/0053213 | A1 | 3/2005 | Giannoit |
| 2005/0105705 | A1 | 5/2005 | Elcock et al. |
| 2006/0140200 | A1 | 6/2006 | Black et al. |

OTHER PUBLICATIONS

Chang, Cheng-Shin et al, Efficient End-to-End Authentication Protocols for Mobile Networks, Personal, Indoor and Mobile Radio Communications, 1996 Seventh IEEE International Symposium. Date of Conference: Oct. 15-18, 1996. vol. 3, pp. 1252-1256.

Clarke, Ronald V. and Newman, Graeme R., Modifying Criminogenic Products: What Role for Government?, Crime Prevention Studies, vol. 18, pp. 7-83 (Jul. 2005).

Lau, Tessa, Etzioni, Oren and Weld, Daniel S., Privacy Interfaces for Information Management, Communications of the ACM, vol. 42, issue 10, pp. 88-94, Oct. 1999.

www.Star38.com/s38.php, (Aug. 31, 2004) via Wayback Machine (archive.org).

In the Matter of Rules and Regulations Implementing the Telephone Consumer Protection Act of 1991, CG Docket No. 02-278, Section XII. Caller Identification, Federal Communications Commission (Jul. 3, 2003) available at: http://hraunfoss.fcc.gov/edocs_public/attachmatch/FCC-03-153A1.pdf.

TCN Broadcasting User's Manual, Jan. 22, 2004, version 1.001.

Lippincott, Melanie G., Global Connect "User's Guide", Sep. 2004.

Maney, Kevin, USA Today Article, Money, "Who's Calling? It might not be who you think it is", website: http://www/usatoday.com/money/industries/telecom/2004-09-01-spoof_x.htm, Sep. 2004.

Torrone, Phillip, Cellphones, Article, Questions about the Caller I.D. falsification (Caller ID Spoofing) service answered, Aug. 2004, website: www.engaadget.com/2004/08/31/questions-about-the-caller-i-d-falsification-caller-id/.

Belson, Ken, The New York Times, Article, "A Commercial Software Service Aims to Outfox Caller ID", Sep. 2, 2004.

Ring Central (Your Phone System Everywhere), Press Release, RingCentral Launches RingOut Clink-to-call feature Helps Entrepreneurs to Generate Sales and Leads, Article, Aug. 19, 2005, website: www.ringcentral.com/whyringcentral/company/press releases/click-to-call.html.

Ring Central (Your Phone System everywhere), Press Release, "RingCentral Announces Virtual Local Telephone Numbers in Major U.S. Cities", Article, Jan. 22, 2004, website: www.ringcentral.com/whyringcentral/company/pressreleases/localnumbers.html.

Civil docket for *NobelBiz, Inc.* v. *Five 9, Inc.*, 6:12-cv-00243-MHS (E.D. Tex. 2012).

Civil docket for *NobelBiz, Inc.* v. *Five 9, Inc.*, 4:13-cv-01846-YGR (N. D. Cal. 2013).

Civil docket for *NobelBiz, Inc.* v. *LiveVox Inc.*, 6:12-cv-00246-MHS (E.D. Tex. 2012).

Civil docket for *NobelBiz, Inc.* v. *LiveVox Inc.*, 4:13-cv-01773-YGR (N. D. Cal. 2013).

Civil docket for *NobelBiz, Inc.* v. *AireSpring, Inc.*, 6:12-cv-00242-LED (E.D. Tex. 2012).

Civil docket for *NobelBiz, Inc.* v. *Global Connect, L.L.C.*, 6:12-cv-00244-MHS (E.D. Tex. 2012).

Civil docket for *NobelBiz, Inc.* v. *T C N, Inc.*, 6:12-cv-00247-MHS (E.D. Tex. 2012).

Civil docket for *NobelBiz, Inc.* v. *inContact, Inc.*, 6:12-cv-00272-LED (E.D Tex. 2012).

Civil docket for *NobelBiz, Inc.* v. *Stage 2 Networks, L.L.C.*, 6:12-cv-00308-LED (E.D. Tex 2012).

Civil docket for *NobelBiz, Inc.* v. *Omega Services, LLC*, 6:12-cv-00432-LED (E.D. Tex. 2012).

Civil docket for *NobelBiz, Inc.* v. *Connect First, Inc.*, 6:12-cv-00549-LED (E.D. Tex 2012).

Civil docket for *NobelBiz, Inc.* v. *Intelligent Contacts, Inc.*, 6:12-cv-00831-MHS (E.D. Tex. 2012).

Civil docket for *NobelBiz, Inc.* v. *InsideSales.com*, 6:13-cv-00360-MHS (E.D. Tex. 2013).

Civil docket for *NobelBiz, Inc.* v. *SafeSoft Solutions Inc.*, 4:13-cv-02423-YGR (N.D. Cal. 2013).

Civil docket for *NobelBiz, Inc.* v. *Veracity Networks, LLC*, 4:13-cv-02518-YGR (N.D. Cal. 2013).

TCN Inc.'s response to First Set of Interrogatories—Partially Redacted, Jun. 14, 2013, *NobelBiz, Inc.* v. *TCN, Inc.*, 6:12-cv-247-JHS (E.D. Tex. 2012).

LiveVox, Inc.'s Disclosure of Invalidity Contentions, May 13, 2013, *NobelBiz, Inc.* v. *LiveVox, Inc.*, 4:13-CV-01773-YGR (N.D. Cal. 2013).

Five 9, Inc.'s Disclosure of Invalidity Contentions, May 13, 2013, *NobelBiz, Inc.* v. *Five 9, Inc.*, 4:13-cv-01846-YGR (N.D. Cal. 2013).

TCN, Inc.'s Invalidity Contentions, Apr. 26, 2013, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).

Global Connect, L.L.C.'s Disclosures of Invalidity Contentions and Accompanying Document Production, Apr. 26, 2013, 6:12-cv-00244-MHS (E.D. Tex. 2012).

| Index | Column A | Column B | Column C |
|---|---|---|---|
| 1 | 954-444-0001 | 201-111-xxxx | 201-111-0001 |
| 2 | 954-444-0001 | 212-222-xxxx | 212-222-0001 |
| 3 | 954-444-0001 | 212-333-xxxx, Mon – Fri | 212-333-0001 |
| 4 | 954-444-0001 | 212-333-xxxx, Sat and Sun | 212-333-0002 |
| 5 | 954-444-0001 | 917-xxx-xxxx | 917-111-0001 |
| 6 | 998-111-0001 | 917-xxx-xxxx | 917-111-0001 |

SYSTEM AND METHOD FOR MODIFYING COMMUNICATION INFORMATION (MCI)

CROSS-REFERENCE TO RELATED APPLICATIONS

This application claims priority to and is a continuation of pending U.S. application Ser. No. 13/013,233, filed Jan. 25, 2011, which claims priority to and is a continuation of U.S. application Ser. No. 11/584,176, filed Oct. 20, 2006, now U.S. Patent No. 7,899,169, which claims priority to U.S. provisional patent application Ser. No. 60/728,717, filed Oct. 20, 2005, entitled System and Method for Modifying Communication Information (MCI), the disclosures of which are incorporated herein by reference.

BACKGROUND OF THE INVENTION

In certain forms of communication, the party being contacted (the "Target") may have the opportunity to know information about the party attempting to originate a communication (the "Originator") before the Target interacts with the Originator. Two notable forms of communication where this is true are telephone and e-mail. In each of those forms of communication, the Target may learn some information about the Originator, such as the Originator's telephone number or email address, before the Target agrees to accept data or create a two-way communication, i.e. a conversation. The information the Target receives may also be used to allow the Target to identify or contact the Originator.

When an Originator, such as a telemarketing firm, wishes to contact a Target, such as an individual, via telephone, the Originator may insert into the caller ID field a telephone number where the Originator may be contacted. When making a call, the Originator inserts a telephone number used at the location from which the call originated, e.g. a call center. However, the Originator may call a Target in an area distant from the Originator. As a result, if the Target wishes to call back the Originator at the telephone number listed, e.g. to be put on a Do Not Call List (DNC) or to receive other information, the Target may have to pay long distance charges to do so. However, the Originator may operate telephone numbers that are a local call from the Target, or are at least closer to the Target, and therefore less expensive to call, than the Originator's telephone number that appears on the Target's caller ID.

Therefore, it would be desirable to implement a system to modify a communication from an Originator to provide a callback number or other contact information to the Target that may be closer to or local to the Target, in order to reduce or eliminate the payment of long distance toll charges in the event the Target dials the callback number.

SUMMARY OF THE INVENTION

The present disclosure relates to a method for processing a communication between a first party and a second party. A communication is received from the first party, the communication having first party information, and second party information. An entry in a database is identified that matches at least one of the first party information and the second party information and for which a predetermined rule is satisfied. A telephone number associated with the matching database entry is selected. The selected telephone number is transmitted to the second party.

DETAILED DESCRIPTION OF THE DRAWINGS

Figure 2:
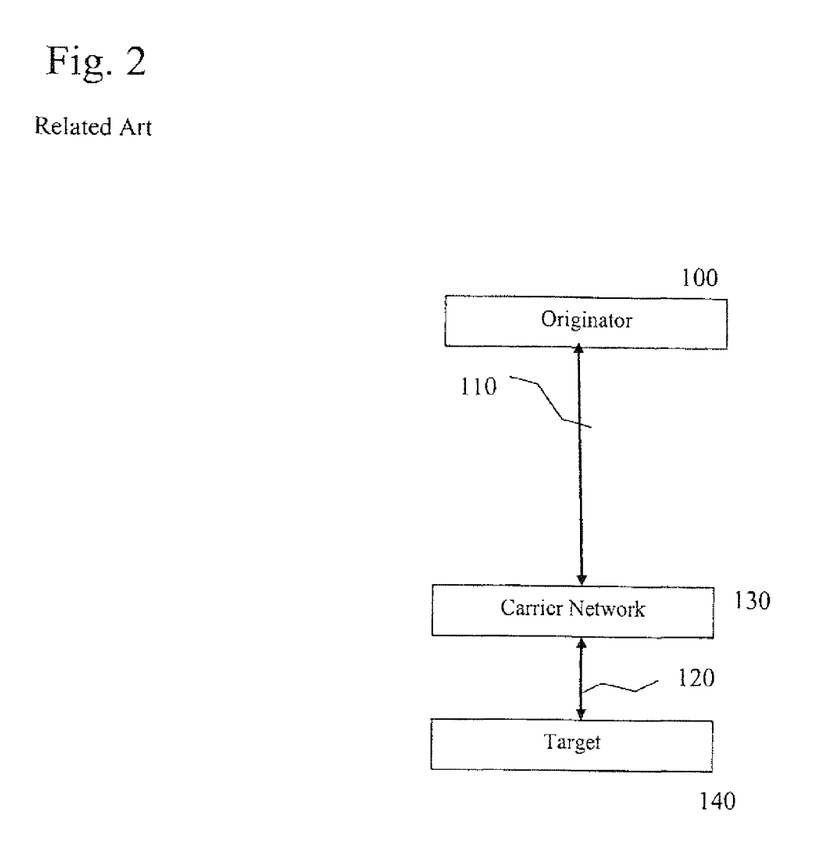
FIG. 2 is a view of an end-to-end telecommunication connection found in related art.

FIG. 2 is a view of an end-to-end contact as would occur during standard communication between Originator 100 (e.g. call center, person or organization) and Target 140 (e.g. a person or organization) using Carrier Network 130 (e.g. telecommunication provider). Information, such as Target 140 telephone number, may be transmitted from Originator 100 to Carrier Network 130 via physical/virtual connection 110 (e.g. phone line, voice T1, voice DS3) for an outbound call. Carrier Network 130 routes the call to Target 140 using, for example, a circuit switch, softswitch, or other routing intelligent system (not shown).

Figure 1:
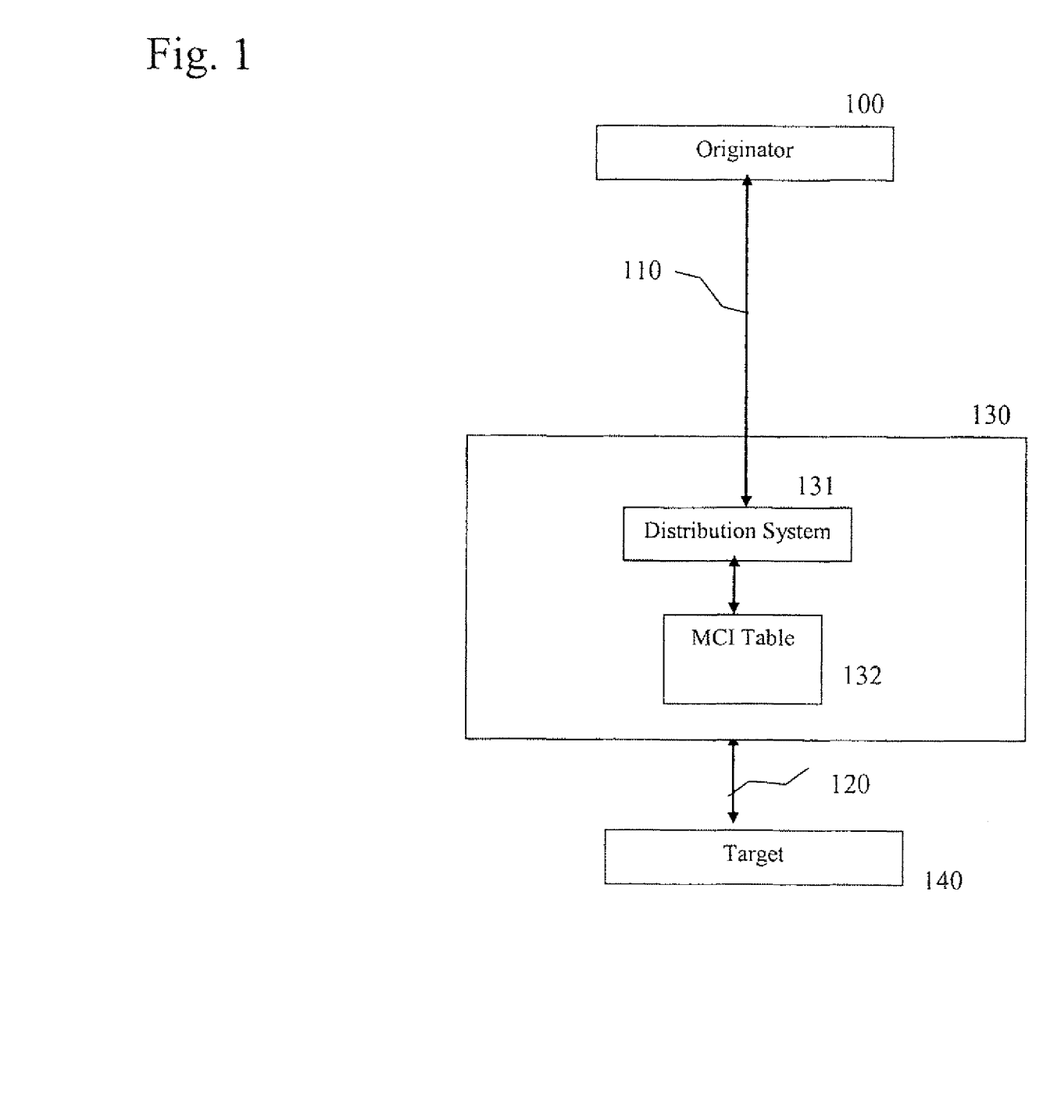
FIG. 1 is a view of an end-to-end telecommunication connection according to an aspect of the system and method of the present disclosure.

FIG. 1 illustrates aspects of the system of the present disclosure and includes Originator 100 which may transmit a call (including, e.g. sound and other data) through physical/virtual connection 110 to Target 140 through Carrier Network 130. Originator 100 may transmit data including signaling messages of telecommunication protocols (e.g., SS7, C7, ISDN, SIP, H.323, MGCP, MEGACO, IAX, IAX2) that may be used to identify or contact Originator 100. This may include caller ID information such as telephone number and subscriber name associated with Originator 100 telephone number.

Originator 100 may transmit Target Identifying Information, including Target 140 telephone number and other information via physical/virtual connection 110 to Carrier Network 130 for outbound calls. Target Identifying Information may include geographic location information about Target 140, which may be determined based on Caller ID of Target 140 in conjunction with telephone subscriber database information.

Carrier Network 130 may route the call to Distribution System 131 which may check each call for a trigger, such as information in the call or where the call originated from, such as which physical/virtual connection 110. Distribution System 131 may be a circuit switch, softswitch, or other routing intelligent system. Distribution System 131 may communicate with a table of data, such as, MCI Table 132, based on the trigger for the call. MCI Table 132 may be stored in a computer, server, database, flash memory or other computing storage device. Target 140 may receive information from the MCI Table 132 in the Caller ID field on received call via physical/virtual connection 120.

In one aspect, the system and method of the present disclosure may operate within or may be connected to Carrier Network 130. In other aspects, the system and method may operate in Originator's 100 PBX (e.g. corporate phone system, predictive dialer, call distribution system) or may be attached to or embedded within Originator's 100 communication device (e.g. telephone, VoIP phone, VoIP soft phone).

Figure 3:
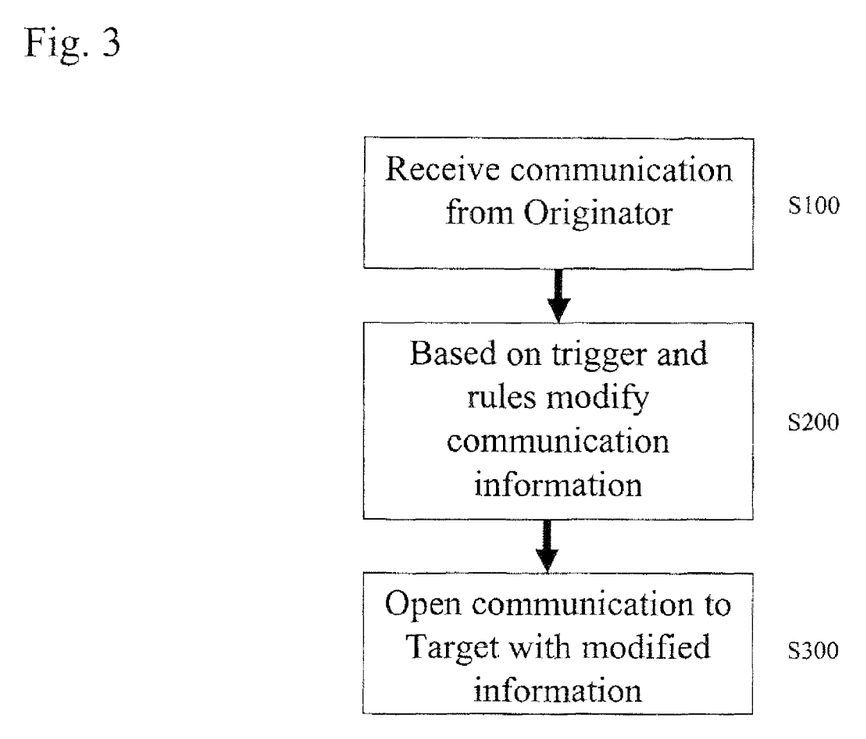
FIG. 3 is a process flow of communication traveling from Originator to Target according to an aspect of the system and method of the present disclosure.

FIG. 3 shows the process flow where in Step S100 a communication is received by Carrier Network 130 from Originator 100. In one aspect, the system of the present invention may receive from Originator 100 Target Identifying Information and a trigger. As described above, Target Identifying Information may include the telephone number of Target 140. A trigger may be one or more predetermined numbers in the Caller ID field, one or more predetermined numbers appended to the telephone number of Target 140 when transmitted by Originator 100, or may be another predetermined communication between Originator 100 and the system.

In Step S200, the system checks the communication for the existence of trigger information and Target Identifying Information, and, based on this information, the system may modify the communication. Rules and data used to modify the communication may be stored in a table database, such as MCI Table 132 shown in FIG. 5.

Figure 5:
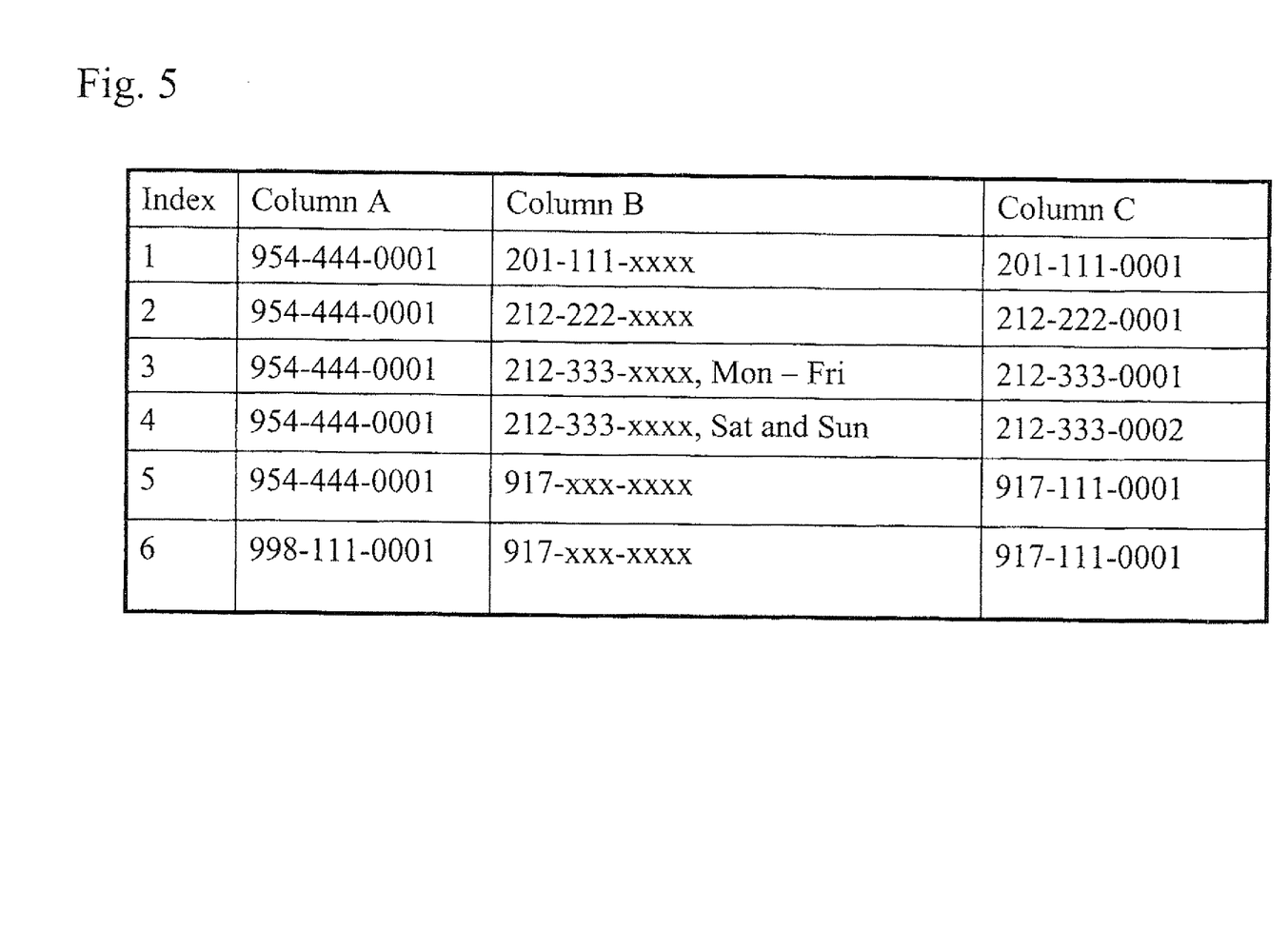
FIG. 5 is a example of a routing table according to an aspect of the system and method of the present disclosure.

As shown in FIG. 5, MCI Table 132 column A is a list of triggers, column B is a list of Target Identifying Information, and column C is a list of modified information that may be displayed to Target 140.

When the system of the present disclosure receives a call from Originator 100, the system may check for one of the triggers located in column A to determine whether this communication may be modified. In one aspect, the system may be initiated manually, e.g. using a website, and may be used to process communications originating from a specific physical or virtual area, e.g. one or more telephone lines, so that any communication originating from one of these areas will be processed by the system. If the system does not receive a trigger or is not initiated manually, then the system may pass the communication on to Target 140 without modifying data.

If the system has been manually initiated or finds the communication contains a trigger listed in column A, the system may then search column B for one or more entries associated with the trigger in column A based on the Target Identifying Information included in the communication. Column B entries may be telephone numbers, portions of telephone numbers, street addresses or geographic designations, such as country, state, city, or township. Column B entries may also include rules indicating how or when they may be applied, for example, days of the week and/or times of day.

In one aspect, the system may search a telephone number in column B that matches Target 140 telephone number. In another aspect, if multiple column B entries for a given trigger match the area code of the Target 140 telephone number, the system may select the column B entry based on prefix. If there are no acceptable column B entries for a trigger, the system may pass the communication without alterations thereto.

In other aspects, column B entries may be selected based on predetermined Originator 100 preference, by geographic proximity to Target 140.

Based on the results of the search in column B, information in the communication may be modified to appear as what is shown in the corresponding entry in column C, i.e. the telephone number in column C may be displayed in the Caller ID field in the call to Target 140.

Using information in MCI Table 132 in FIG. 5, suppose for example, the system encounters a telephone call coming from Originator 100 telephone number 954-444-0001 that is made to Target 140 having telephone number 212-333-1234 on a weekday. The system may note the incoming caller ID field 954-444-0001 and attempt to match this to a trigger entry in column A. In this case, the number 954-444-0001 has five matches in column A, corresponding to table index entries A1 through A5. Once one or more acceptable entries are found in column A, the system may then compare Target ID information, in this case 212-333-1234, with one or more entries in column B corresponding to the one or more acceptable entries in column A.

In one aspect, the "x" character may be used as a wildcard to signify any character or number. Although not shown, such a wildcard character may also be used in elsewhere in the table.

In one aspect, the system may compare the Target ID information with the entries in column B by area code, prefix, and other rules, such as time of day. It will be clear to one of ordinary skill that the type, order and priority of such data comparison may be configurable.

Continuing the example, of the presently eligible entries 1-5 in column B, only entries 2, 3, and 4 match the area code "212" of the Target ID information, and of those, entries 3 and 4 match both the area code "212" and prefix "333" of the Target ID information. Column B entries 3 and 4 each contain a rule relating to the day of the week the call is made. In this example, because the call is placed on a weekday, column B entry 3 is the closest match to the Target ID information, and all rules of that entry are satisfied.

Based on this match in column B, the system may modify the communication to send an outbound Caller ID to Target 140 having the contents of entry 3 in column C, here 212-333-0001. Therefore, Target 140 may then make a return call to a local telephone number 212-333-0001 at a local area code (212), rather than potentially incurring long distance charges by making a return call to Originator 100 at a non-local number 954-444-0001 at a non-local area code (954).

In Step S300 the system then establishes the communication with Target 140 containing modified information.

Originator 100 may receive calls made to the telephone numbers listed in column C. Originator 100 may operate the telephone numbers listed in column C and/or calls to the telephone numbers in column C may be directed to telephone numbers used by Originator 100, in a manner described below with reference to FIG. 4.

Figure 4:
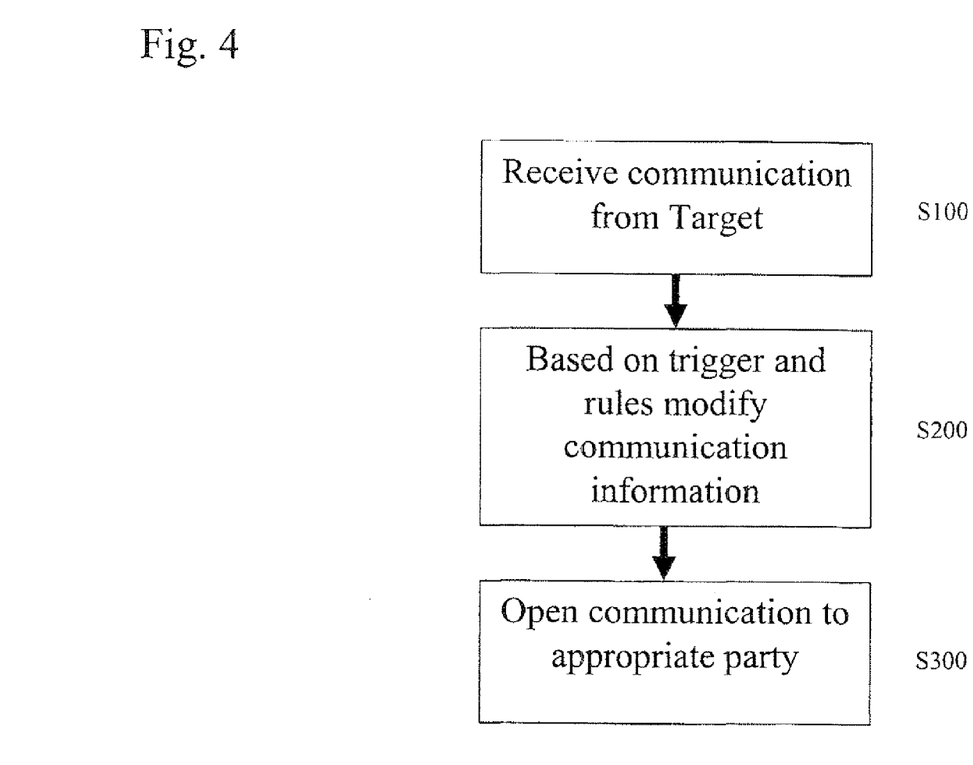
FIG. 4 is a process flow of communication traveling from Target to Originator according to an aspect of the system and method of the present disclosure.

FIG. 4 shows the process flow, according to an aspect of the invention, when a communication is initiated by Target 140 to Originator 100. The system may receive the communication from Target 140 in Step S100. In Step S200, based on a set of rules, Target Identifying Information and the telephone number Target 140 is calling, the system may modify and/or route the communication to Originator 100. Originator 100 may receive the communication at an inbound customer service center or voice recording, at a predetermined telephone number. When routing and/or modifying Target 140 call, the system may use a table.

In Step S300, the system sends the communication to the appropriate party. When the system routes a call from Target 140 to Originator 100, the system may pass any one of the following information to Originator 100: the telephone number of Target 140, the "trigger" number in column A associated with that telephone number, or other identifier correlated to the Target 140, such as geographic location of the Target 140. In addition, the system can forward the call from Target 140 to a telephone number, trunk line, IP address as a VoIP call, or any other form of return communication as predetermined rules dictate.

Although illustrative embodiments have been described herein in detail, it should be noted and will be appreciated by those skilled in the art that numerous variations may be made within the scope of this invention without departing from the principle of this invention and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

What is claimed is:

1. A system for handling an outbound call from a call originator to a call target, the system comprising:
   a database storing a plurality of outgoing telephone numbers, each outgoing telephone number having one of two or more area codes; and
   an information processor controlled by the call originator and configured to:
   a) process a trigger comprising at least an area code of a telephone number of the call target;
   b) select from the database a telephone number from the plurality of outgoing telephone numbers where the selected telephone number has at least an area code the same as the area code of the telephone number of the call target;
   c) set caller identification data of the outbound call to the selected telephone number; and
   d) transmit the caller identification data to the call target in connection with the outbound call.

2. The system of claim 1, wherein the system is embedded in one of a carrier network, a private branch exchange, and a communications device.

3. The system of claim 2, wherein the communications device is one of a telephone, a VoIP phone, and a VoIP soft phone.

4. The system of claim 1, wherein the system is embedded in one of a corporate phone system, a predictive dialer, and a call distribution system.

5. The system of claim 1, wherein the selected telephone number has an area code and a prefix the same as an area code and a prefix of the telephone number of the call target.

6. The system of claim 1, wherein the selected telephone number has an area code different from an area code of a telephone number of the call originator.

7. A computer for handling an outbound call from a call originator to a call target, the computer comprising:
   memory having at least one region for storing computer executable program code; and
   processor for executing the computer executable program code stored in the memory, where the computer executable program code comprises:
   code for processing at least a portion of a telephone number of the call target;
   code for accessing a database storing a plurality of outgoing telephone numbers, each outgoing telephone number having one of two or more area codes;
   code for selecting from the database a telephone number from the plurality of outgoing telephone numbers based on at least a portion of the telephone number of the call target, the selected telephone number having an area code from a geographic region the same as a geographic region of an area code of the telephone number of the call target;
   code for setting caller identification data of the call to the selected telephone number; and
   code for transmitting the caller identification data to the call target in connection with the outbound call.

8. The computer of claim 7, wherein the selected telephone number has at least an area code the same as an area code of the telephone number of the call target.

9. The computer of claim 7, wherein the geographic region is one of a state and other municipality smaller than a state.

10. The computer of claim 7, wherein the area code of the selected telephone number is associated with a state different from a state associated with the area code of the telephone number of the call target.

11. The computer of claim 7, wherein the selected telephone number has an area code and a prefix the same as an area code and prefix of the telephone number of the call target.

12. The computer of claim 7, wherein the area code and prefix of the selected telephone number corresponds to a geographic region the same as the area code and prefix of the telephone number of the call target.

13. The computer of claim 12, wherein the geographic region is one of a state and other municipality smaller than a state.

14. The computer of claim 7, wherein the computer is embedded in one of a carrier network, a private branch exchange, and a communications device.

15. The computer of claim 14, wherein the communications device is one of a telephone, a VoIP phone, and a VoIP soft phone.

16. The computer of claim 7, wherein the computer is embedded in one of a corporate phone system, a predictive dialer, and a call distribution system.

17. The computer of claim 7, wherein the area code of the selected telephone number is of a geographic region different than a geographic region of the call originator.

18. A computer implemented method for handling an outbound call from a call originator to a call target comprising:
   processing a trigger in the form of at least a portion of a telephone number of the call target;
   accessing a database storing a plurality of outgoing telephone numbers, each outgoing telephone number having one of two or more area codes;
   selecting from the database a telephone number from the plurality of outgoing telephone numbers based on at least a portion of the telephone number of the call target, the selected telephone number having an area code from a geographic region the same as a geographic region of an area code of the telephone number of the call target;
   setting caller identification data of the call to the selected telephone number; and
   transmitting the caller identification data to the call target in connection with the outbound call.

19. The computer implemented method of claim 18, wherein the selected telephone number has at least an area code the same as an area code of the telephone number of the call target.

20. The computer implemented method of claim 18, wherein the geographic region is one of a state and other municipality smaller than a state.

21. The computer implemented method of claim 18, wherein the selected telephone number has an area code and a prefix the same as an area code and prefix of the telephone number of the call target.

22. The computer implemented method of claim 18, wherein the area code and prefix of the selected telephone number corresponds to a geographic region the same as the area code and prefix of the telephone number of the call target.

23. The computer implemented method of claim 22, wherein the geographic region is one of a state and other municipality smaller than a state.

24. The computer implemented method of claim 18, wherein the method is performed in one of a carrier network, a private branch exchange, and a communications device.

25. The computer implemented method of claim 24, wherein the communications device is one of a telephone, a VoIP phone, and a VoIP soft phone.

26. The computer implemented method of claim 18, wherein the method is performed in one of a corporate phone system, a predictive dialer, and a call distribution system.

27. The computer implemented method of claim 18, wherein the area code of the selected telephone number is of a geographic region different than a geographic region of the call originator.

* * * * *